United States Patent Office 3,025,254
Patented Mar. 13, 1962

3,025,254
COATING COMPOSITIONS OF ASPHALTENES AND OXIDIZED LIQUID DIOLEFIN POLYMERS
Neville Leverne Cull, Baker, and Glen Porter Hamner, Baton Rouge, La., assignors to Esso Research and Engineering Company, a corporation of Delaware
No Drawing. Filed Mar. 11, 1960, Ser. No. 14,199
7 Claims. (Cl. 260—28.5)

This invention relates to new and useful coating compositions and more specifically relates to coating compositions comprising mixtures of oxidized liquid polymer oils and asphaltenes.

It is known to prepare coating compositions from oxidized liquid polymers of conjugated diolefins. However, such compositions are relatively expensive and films formed from them are relatively brittle.

Accordingly, it is the main object of the present invention to provide an economical coating composition which will form films which will remain relatively flexible after curing.

This and other objects of the invention are accomplished by providing a coating composition comprising a mixture of asphaltenes and oxidized liquid polymers of cyclic and acyclic diolefins of 4 to 6 carbon atoms.

Asphaltenes may be obtained from bituminous material, such as steam or vacuum-reduced residues, cracking residues, oxidized or air-blown asphalts, or from natural asphalts, such as those from Trinidad, crudes or reduced crudes containing asphalt—as well as from naturally occurring coal tars and pitches from the destructive distillation of peat, lignite, shale, wood, and other organic matter.

The asphaltenes are the highest molecular weight component of asphalt and may be obtained by a number of methods. For example, the asphaltenes may be precipitated from the bituminous materials of precipitation with normal pentane, isopentane, normal hexane, petroleum ether, etc. Pentane, or its equivalent, is the preferred solvent, and for the purposes of this specification "asphaltenes" will include the insoluble portions precipitated out by mixing the bituminous materials with normal pentane. The amount of pentane varies between 3 and 10 volumes per volume of bituminous material.

Typical asphaltenes have a specific gravity of 1.16, a ring and ball softening point range of 320°–330° F., a needle penetration hardness at 77° F. of zero, and an average neutralization number of 0.50. They contain only a trace of mineral matter and have a solubility in carbon disulfide of above 99%. They are very friable in nature and possess extremely low impact resistance and ductility.

The coating compositions of this invention comprise asphaltenes and oxidized polymers of cyclic and acyclic diolefins of 4 to 6 carbon atoms. When desirable, oxidized steam-cracked petroleum resins and crosslinking agents, such as metal esters and alcoholates, melamine and peroxides, etc., may be added.

The oxidized diolefin polymers used in the novel coating composition of this invention are obtained by air blowing a polymer oil prepared by polymerization of conjugated diolefins of 4 to 6 carbon atoms with finely divided sodium in the presence of a hydrocarbon diluent at temperatures of 20° to 105° C. It is often desirable to copolymerize the conjugated diolefin with 0 to 50 parts by weight of a vinyl aromatic hydrocarbon, such as styrene. A particularly suitable polymer oil is prepared from 75 to 85 parts of butadiene-1,3 and 25 to 15 parts of styrene.

Details for the preparation of these oils may be found in U.S. Patent 2,762,851 issued September 11, 1956, to A. H. Gleason, the subject matter of which is incorporated herein by reference.

Polymer oils suitable for use in this invention may also be prepared by mass polymerization in the presence of a hydrocarbon soluble peroxide catalyst, such as benzoyl peroxide or cumene hydroperoxide as described in U.S. Patent No. 2,586,594 to Arundale. Under proper conditions the emulsion polymerization technique may also be adapted to the preparation of the drying oils used in this invention.

The polymer oils obtained by the above methods are dissolved in any aliphatic or aromatic hydrocarbon solvent, or mixture thereof, boiling at temperatures up to 200° C. with which they are compatible and blown with air or oxygen at temperatures between room temperature and about 150° C., preferably 90° to 120° C., until 5 to 20% oxygen has been incorporated into the polymer oil. The blowing is best carried out in the presence of catalysts including the organic salts of metals, such as the naphthenates, octoates, and other hydrocarbon soluble metal salts of cobalt, lead, iron, and manganese.

The coating compositions of the present invention may be produced by hot blending the asphaltenes with the blown polymer oil in the ratio of 10–90 parts by wt. of asphaltenes to 90–10 parts by wt. of air-blown polymer oil. When desired, the resulting blend may be cut back with a volatile solvent to obtain a consistency suitable for the particular method of application to be used. Examples of suitable solvents include light petroleum distillates, kerosene, gas oil, mineral spirits, etc.

Other agents, such as oxidized petroleum resins, and conventional cross-linking agents may be added. When used, the oxidized petroleum resins are substituted for a portion of the oxidized polymer oil and used in proportions of 25 to 50 wt. percent based on the asphaltene-oxidized polymer blend. Such resins are made from petroleum stream-cracked distillates boiling in the range of about 18° to 230° C. or any fraction boiling within this range, as the $C_5$–$C_7$ fraction boiling 18° to 85° C., or the isoprene-free $C_5$ fraction boiling 38 to 46° C. Such fractions are obtained by cracking heavy naphtha, kerosene, gas oil, and the like at relatively low pressures and at temperatures of 1000° to 1600° F. in the presence of steam for relatively short times. The cracked product is fractionated to give the desired cut which is then polymerized by means of a Friedel-Crafts catalyst at temperatures between $-18°$ and $+66°$ C. The crude resin is stripped free of unreacted feed and any low molecular weight products to give the final resin. This resin is then blown with air as described above in connection with the liquid diolefin polymer, either alone or in admixture with the diolefin polymer oil.

The resultant blends are laid down as films on any desired surface and cured by baking, for example, for 10 to 30 minutes at 125°–250° C. They may also be air cured or subjected to the action of chemical curing agents at room, or only slightly elevated, temperature such as sulfur dioxide.

The invention can be more fully understood by applying the following illustrative examples to the discussion and disclosure herein set forth. The asphaltenes used in the examples were prepared by pentane precipitation of Bachaquero residuum.

*Example I*

A solution in Solvesso 100 (an aromatic hydrocarbon fraction boiling 156°–177° C. having a Kauri-Butanol value of 98–100) of a butadiene-styrene copolymer oil made in accordance with the following recipe:

| | |
|---|---|
| Butadiene-1,3 _____Parts by wt. | 80 |
| Styrene _____do | 20 |
| Straight-run mineral spirits[1]_____do | 200 |
| Dioxane_____do | 40 |
| Isopropanol _____do | 0.2 |
| Sodium catalyst_____do | 1.5 |
| Temperature _____°C | 50 |

[1] Boiling 150°–200° C.

was blown with air at a temperature of about 50°–60° C. in the presence of about 1% manganese naphthenate until about 10% oxygen had been incorporated. A second sample was blown until about 15% oxygen had been incorporated.

*Example II*

A blend of 20 g. of asphaltenes dissolved in 40 ml. of xylene and 10 grams of the air blown polymer of Example I containing 10% oxygen was prepared and coated on tin plate and cured 30 minutes at 150° C. The resultant black film was adhesive and flexible, easily passing the ⅛ inch mandrel test. A second film prepared from the same mixture containing 1% titanium tetraisopropylate showed essentially the same results.

*Example III*

A 40 wt. percent solution of asphaltenes in xylene was prepared and coated on tin plate. After curing for 1 hr. at 150° C. the film failed ½ inch mandrel test and was brittle and non-adhesive.

*Example IV*

A blend composed of 25% by wt. of the oxidized polymer of Example I, containing 10% oxygen, and 75% asphaltenes when laid down as a coating on tin plate and cured for 1 hr. at 150° C. formed a film which showed no tack and passed the ⅛ inch mandrel test for flexibility.

*Example V*

A blend of 75 wt. percent asphaltenes, and 25 wt. percent of the oxidized polymer of Example I (60% N.V.M.) containing 10% oxygen was further mixed with 40% oxidized petroleum resins and 0.6 wt. percent of titanium tetraisopropylate and coated on tin plate. After curing for 1 hr. at 150° C. a tack-free film which passed the ⅛ inch mandrel test was obtained. When the amount of titanium tetraisopropylate was increased to 5 wt. percent, the film was harder but brittle, failing the ½ inch mandrel test.

*Example VI*

A blend of 25 wt. percent oxidized polymer of Example I, containing 10% oxygen and 75 wt. percent asphaltenes, was prepared. To separate portions of this blend there were added 3 wt. percent and 6 wt. percent ditertiary butyl peroxide and films were formed from each portion and cured 1 hr. at 150° C. The film containing the 3 wt. percent peroxide failed the ⅛ inch mandrel test and was harder than that of Example III. The film containing 6% peroxide failed the ¼ inch mandrel test and was even harder than the film containing only 3% peroxide.

*Example VII*

A blend was prepared from 75 wt. percent of asphaltenes and 25 wt. percent of the oxidized polymer of Example I, containing 15% oxygen. Films prepared from these blends required baking for 16 hrs. at 150° C. before they were tack free. The films were much harder than those prepared from blends containing the 10% oxygen content polymer. Blends containing 70% solvent gave hard films which passed the ⅛ inch mandrel test, while blends containing only 58% solvent gave very hard films which failed the ½ inch mandrel test.

*Example VIII*

A blend of 75 wt. percent asphaltenes and 25 wt. percent of oxidized polybutadiene (40% N.V.M.) was laid down as a 1.5 mil film on tin plate and baked for 5 hrs. at 150° C. The oxidized polybutadiene was prepared as described in Example I, except the styrene monomer was omitted and contained 10% oxygen. The cured film adhered well to the steel base, possessed a pencil hardness of 2B and passed ⅛ inch mandrel test. When non-oxidized polybutadiene was blended in the same proportions with asphaltenes, the resulting films, after baking under identical conditions, showed very poor adhesion and failed the ½ inch mandrel test.

The above examples show that tack-free films having good adhesion can be prepared from blends of asphaltenes and oxidized polymer oils. The addition of oxidized petroleum resins to the blend does not detract from the quality of the film but will further add to their economicalness. The use of oxidized polymers containing larger amounts of oxygen gives harder films but such films require longer times to cure. The hardness and brittleness of the films can be increased by the addition of peroxides, such as ditertiary butyl peroxide, and metal esters, such as titanium tetraisopropylate.

The nature of the present invention having been thus fully set forth and specific examples of the same given, what is claimed as new and useful and desired to be secured by Letters Patent is:

1. A coating composition comprising from 10 to 90% by wt. of asphaltenes and 90 to 10% by wt. of an air-blown polymer of a conjugated diolefin of 4 to 6 carbon atoms.

2. A coating composition comprising 75% by wt. of asphaltenes and 25% by wt. of an oxidized polymer of butadiene containing from 10 to 15 wt. percent oxygen.

3. A composition according to claim 2 which contains in addition about 40% by wt. of oxidized petroleum resins, based upon the combined weight of asphaltenes and oxidized diolefin polymer.

4. A composition according to claim 2 which contains in addition 0.5 to 5 wt. percent of titanium tetraisopropylate, based upon the combined weight of asphaltenes and oxidized diolefin polymer.

5. A composition according to claim 2 which contains in addition 3 to 6 wt. percent of ditertiary butyl peroxide, based upon the combined weight of asphaltenes and oxidized diolefin polymer.

6. Composition according to claim 2 in which the oxidized polymer is oxidized polybutadiene.

7. Composition according to claim 2 in which the oxidized polymer is the oxidized copolymer of 80 parts by wt. percent butadiene-1,3 and 20 parts of styrene.

References Cited in the file of this patent
UNITED STATES PATENTS 2,009,712     Frolich _____ July 30, 1935

FOREIGN PATENTS 576,624     Canada _____ May 26, 1959